(12) United States Patent
Gradzki

(10) Patent No.: US 6,377,087 B1
(45) Date of Patent: *Apr. 23, 2002

(54) DRIVING SCHEME FOR BIPOLAR TRANSISTORS

(75) Inventor: Pawel M. Gradzki, Milford, CT (US)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/664,627

(22) Filed: Jun. 17, 1996

Related U.S. Application Data

(63) Continuation-in-part of application No. 08/384,195, filed on Feb. 6, 1995, now abandoned, which is a continuation of application No. 08/006,089, filed on Jan. 19, 1993, now abandoned.

(51) Int. Cl.$^7$ .................................................. G11C 8/00
(52) U.S. Cl. ........................................ 327/110; 327/112
(58) Field of Search ............................... 327/108, 110, 327/170, 188, 190, 112, 300, 304, 379, 482, 579; 315/209, 219, 226; 363/37, 131, 133

(56) References Cited

U.S. PATENT DOCUMENTS

| | | | | |
|---|---|---|---|---|
| 3,662,249 A | * | 5/1972 | Wijsboom | ................... 363/133 |
| 4,302,807 A | * | 11/1981 | Mentler | ...................... 327/188 |
| 4,318,011 A | * | 3/1982 | Zeis | ........................... 327/579 |
| 4,513,226 A | * | 4/1985 | Josephson | ................... 315/219 |
| 4,682,082 A | * | 7/1987 | MacAskill et al. | ......... 315/219 |
| 4,686,427 A | * | 8/1987 | Burke | ........................ 315/219 |
| 4,725,741 A | * | 2/1988 | Shekhawat et al. | ......... 327/483 |
| 4,873,471 A | * | 10/1989 | Dean et al. | ................. 315/308 |
| 4,910,416 A | * | 3/1990 | Salcone | ...................... 327/374 |
| 4,947,055 A | * | 8/1990 | Shekhawat et al. | ......... 327/109 |
| 5,099,138 A | * | 3/1992 | Fukunaga | ................... 327/109 |
| 5,214,355 A | * | 5/1993 | Nilssen | ....................... 315/219 |

* cited by examiner

Primary Examiner—Terry D. Cunningham

(57) ABSTRACT

A driving circuit for bipolar transistors having a control voltage device for producing a control voltage associated with each transistor. A tertiary winding, serving as the base winding for the bipolar transistors, supplies current to the base of each bipolar transistor based on the associated control voltage. Separate feedback circuits associated with each transistor carry a feedback signal reflecting the minority carrier charge stored in the associated transistor. The control voltage associated with each transistor varies based on the associated feedback signal.

15 Claims, 3 Drawing Sheets

US 6,377,087 B1

DRIVING SCHEME FOR BIPOLAR TRANSISTORS

CROSS-REFERENCE TO RELATED APPLICATIONS

This is a continuation-in-part of parent application Ser. No. 08/384,195, filed Feb. 6, 1995, now abandoned which is a continuation of grandparent application Ser. No. 08/006,089, filed Jan. 19, 1993 and now abandoned.

BACKGROUND OF THE INVENTION

This invention relates generally to a driving scheme for a bipolar transistor, and more particularly to a scheme for driving a push-pull pair of bipolar transistors in a ballast inverter.

Conventional ballast inverters of the push-pull type employ bipolar power transistors having relatively high switching losses when driven into deep saturation during other than maximum load conditions. Switching losses vary based on load conditions imposed on the ballast inverter and are difficult to minimize for all load conditions. The relatively high switching losses also result in the transistors operating at relatively high temperatures which are typically above 60° C. Such relatively high operating temperatures require heat sinks thereby raising the inverter manufacturing cost.

In selecting or designing a base driving scheme for a ballast inverter, the characteristics and parameters of the power transistors, such as current gain, are important and normally must be carefully specified to achieve desired ballast operating characteristics. Different types of bipolar transistors can have different characteristics and/or parameters and therefore cannot be readily substituted for one another in a particular base driving circuit. Significant voltage transients can also appear across the bipolar transistors during turn-on of the lamp ballast. These voltage transients when applied across the bipolar transistors can result in transistor failure.

Conventional ballast inverters sometimes employ Baker clamps in order to more quickly turn-off each bipolar transistor, that is, to more closely simulate the switching speed of field effect transistors. A Baker clamp, however, requires use of a relatively expensive high voltage fast recovery diode, which further increases power losses and cost. A Baker clamp is shown, for example, as diode D in FIGS. 6 or 7 of U.S. Pat. No. 4,318,011 issued to Jurgen Zeis.

A base driving scheme for a conventional ballast inverter also typically requires that the bipolar transistors have a constant, forced current gain. In other words, the base current is maintained in a fixed relationship relative to the collector or emitter current. This requirement limits the range of equivalent bipolar transistors which can be employed within the ballast inverter design, which limits standardization of components used within the ballast inverter.

Accordingly, it is desirable to provide an improved driving scheme for bipolar transistors in which relatively high switching losses are avoided resulting in relatively low operating temperatures of the bipolar transistors. The driving scheme should also permit a relatively wide range of different bipolar transistors to be used in the same circuit while optimizing (i.e. minimizing) switching losses regardless of load conditions. The driving scheme should also minimize the possibility of relatively large voltage transients appearing across the transistors and avoid the need for expensive Baker clamps to provide relatively high speed switching of the bipolar transistors.

U.S. Pat. No. 4,318,011 cited above describes circuits for maintaining what is called the storage period ts of a transistor substantially constant. The storage period ts is defined as the period of delay between the time that the base drive input current switches to its turn-off level (or blocking phase level, which is low in the described embodiment) and the time that the collector voltage begins to switch to its turn-off level (which is high in the described embodiment). This storage period ts increases as the transistor goes more deeply into saturation. Switching losses for the transistor are related to how deeply the transistor enters saturation during the switch-on (or conduction) state and thus can be reduced by reducing this storage period ts.

FIG. 1 is a block diagram of the general scheme described in this patent and corresponds to FIG. 3 of the Zeis patent. A transistor T is provided with a base drive current Ib that is controlled in magnitude by control circuit 1, which in turn responds to an output Ur from comparator 2.

Comparator 2 is shown in more detail in FIG. 2, which corresponds to FIG. 5 of the Zeis patent. As shown in FIG. 2, whenever transistor T switches off, comparator 2 obtains a measured difference value Url between the collector voltage Uc of transistor T and the inverse of base drive input voltage Ue. A memory S stores the time integral of Url for use in controlling the base current of transistor T during the next time that transistor T is turned on.

FIG. 3 corresponds to FIG. 4 of the Zeis patent and shows voltage curves during switching of transistor T. As shown in FIG. 3, Url is a pulse waveform that occurs whenever transistor T is turning off. The width of this pulse corresponds to the storage period ts plus the time that it takes for the collector voltage to drop to the turn-off level, which is the total actual time taken by transistor T to turn off after the base drive input voltage Ue drops to turn off transistor T. I call this the turning off time period. It is the objective of the control circuit in the Zeis patent to maintain the time ts substantially constant.

To do this, the Url pulse is integrated each time the transistor T turns off to obtain a value Ur corresponding to the turning off time and this integrated value Ur is then stored in memory S until a new value Ur is obtained when transistor T turns off a next time. When the base drive input voltage Ue rises sufficiently to once again turn on transistor T, this stored value Ur is used by control circuit 1 to limit the base drive current so as to keep the turning off time measured the next time that the transistor T turns off substantially constant.

While the circuits shown in this prior art patent control the depth of saturation of transistor T with a feedback circuit, this is done only indirectly in that the parameter being sensed or measured (i.e., the turning off switching time period) is not the same parameter being directly controlled (i.e., the base driving current). The relationship (i.e., proportionality constant) between the base drive current and the turning off switching time period is not the same for different transistors, thereby making the gain (and therefore the performance) of any feedback circuit of this kind highly dependent upon transistor parameters. Accordingly, any such circuit apparently would need to be tuned or adjusted for different transistors if switching losses are to be minimized, which is undesirable.

SUMMARY OF THE INVENTION

In accordance with the present invention, on the other hand, saturation of the transistor is controlled instead by directly measuring and controlling the minority carrier charge stored in the transistor. When a bipolar transistor switches from an ON (or conduction) state to an OFF state, the minority carrier charge in the transistor is removed through the base of the transistor in the form of a reverse base current transient pulse that occurs each time that the transistor turns off. In accordance with this invention, saturation of a transistor is controlled by measuring the minority carrier charge itself stored during the conduction state (above a threshold) directly as it is removed in the reverse direction through the base when the transistor is tuning off. The measured value of the stored minority carrier charge (above the threshold) that is removed when the transistor is turning off is then used by a control circuit to control the base drive current when the transistor is next switched again to the conduction state. The control circuit controls the base drive current such that the minority carrier charge that becomes stored during the conduction state (and removed when the transistor is again turned off) is maintained at a substantially constant level that can be set. Since the stored minority carrier charge is being measured directly and is also being inserted and removed as a component of the base drive current (current being a flow of charge per unit of time), the sensed parameter (charge removed) and the controlled parameter (charge flow) are closely related and this relationship does not vary very much from transistor to transistor, unlike when the sensed parameter is the turning off switching time period as in the Zeis circuits. While the turning off switching time clearly increases when the amount of stored minority carrier charge increases during the conduction state, the amount of base resistance and other variables makes the relationship between stored minority carrier charge and the tuning off switching time period imprecise and variable from transistor to transistor. Thus, when the turning off switching time is used to control base drive current, the controlled power transistors must have specified characteristics or else tuning or adjustment of the base drive feedback circuit is needed, unlike with the presently described scheme.

In accordance with the invention, a driving circuit for a bipolar transistor having at least a base and a stored minority carrier charge during conduction includes a control voltage device for producing a control voltage for the transistor, a reverse base current sensing circuit for measuring the minority carrier charge stored in the transistor, a current supply for supplying current to the base of the transistor based on the value of the control voltage and a feedback circuit for the bipolar transistor for varying the control voltage based on the measured minority carrier charge stored in the bipolar transistor. When more than one bipolar transistor is controlled, these elements are repeated individually for each transistor.

By varying the control voltage for the bipolar transistor based on the minority carrier charge stored in the bipolar transistor, the bipolar transistor is prevented from being too deeply saturated. Switching losses during no-load conditions are therefore minimized. The reduction in the amount of stored minority carriers within the bipolar transistor during its conduction state results in switching of the bipolar transistor much more quickly. The switching time of the bipolar transistor approaches the switching time of a field effect transistor.

The present invention does not need to employ a Baker clamp in the base driving scheme and therefore avoids the relatively high power losses and other costs associated with such clamps. The reduced switching loss also results in the bipolar transistor operating at a lower temperature.

The self correcting feedback circuit keeps the bipolar transistor only lightly saturated when in its conductive state. When more than one bipolar transistor is controlled in accordance with this invention, each bipolar transistor has an individual feedback circuit that operates independently of the other feedback circuits. Bipolar transistors used in the driving scheme need not have the same or predetermined operating characteristics. In fact, a wide range of bipolar transistors having different operating characteristics can be employed in the driving scheme of the present invention without individual adjustment requirements.

In accordance with a feature of the invention, the control voltage device includes a capacitor. The voltage across the capacitor serves as the control voltage for the bipolar transistor.

The feedback circuit includes a feedback transistor associated with each bipolar transistor. The feedback transistor is responsive to the state of the associated bipolar transistor for directing reverse base current of the associated bipolar transistor to the associated capacitor. The level of current supplied to the base of each transistor by the current supply is directly proportional to the control voltage produced on the associated capacitor.

In accordance with another aspect of the invention, a method for driving a pair of bipolar transistors in which each transistor has at least a base and a minority carrier charge includes the steps of producing a control voltage associated with each transistor, supplying current to the base of each transistor based on the associated control voltage and varying the control voltage associated with each transistor based on the minority carrier charge stored in the latter. The driving method can also include controlling through switching means associated with each transistor when minority carrier charge is flowing in a reverse direction out of the base in response to the state of that transistor. Preferably, the level of current supplied to the base of each transistor is maintained directly proportional to the associated control voltage. The driving method also includes controlling the current supplied to the base of and thereby reducing power losses during conduction of each transistor. In accordance with a feature of this driving method, only one control voltage is adjusted at any instant in time.

Accordingly, it is an object of the invention to provide an improved driving scheme for bipolar transistors which minimizes switching and conduction losses.

It is another object of the invention to provide an improved bipolar transistor driving scheme in which the bipolar transistors operate at relatively low temperatures.

It is a further object of the invention to provide an improved bipolar transistor driving scheme encompassing/accommodating a wide range of bipolar transistor equivalents.

It is yet another object of the invention to provide an improved bipolar transistor driving scheme having switching characteristics comparable to a field effect transistor (FET).

It is still another object of the invention to provide an improved bipolar transistor driving scheme which permits variation in transistor current gain.

It is yet a further object of the invention to provide an improved bipolar transistor driving scheme which maintains the bipolar transistors in a lightly saturated condition when in a conductive state.

Still other objects and advantages of the invention will, in part, be obvious, and will, in part, be apparent from the specification.

The invention accordingly comprises several steps and a relation of one or more of such steps with respect to each of the others, and a device embodying features of construction, combination of elements and arrangements of parts which are adapted to implement such steps, all as exemplified in the following detailed disclosure. The scope of the invention will be indicated in the claims.

BRIEF DESCRIPTION OF THE DRAWINGS

For a fuller understanding of the invention, reference is had to the following description taken in combination with the accompanying drawings, in which.

DETAILED DESCRIPTION OF THE PREFERRED EMBODIMENTS

When a bipolar transistor is in the conduction state with forward base current, the collector region is flooded with minority carriers, which results in high conductivity of the collector region and low saturation voltage. When the bipolar transistor is then turned off, there is a transient turning off phase, during which a portion of the collector current is diverted through the base and leaves the transistor through the base terminal to remove the minority carrier charge stored in the collector region, thereby producing a transient reverse base current. Once the transistor is completely turned off (i.e., is in the off state), the reverse base current ceases, except for a junction leakage current and a collector junction capacitance displacement current. However, if too much forward base current is supplied during the conduction state, an excessive minority carrier charge is stored in the collector. Then it takes additional time to remove this excessive minority carrier charge through the base during the turning off phase and thus excessive switching losses are incurred.

Figure 1:
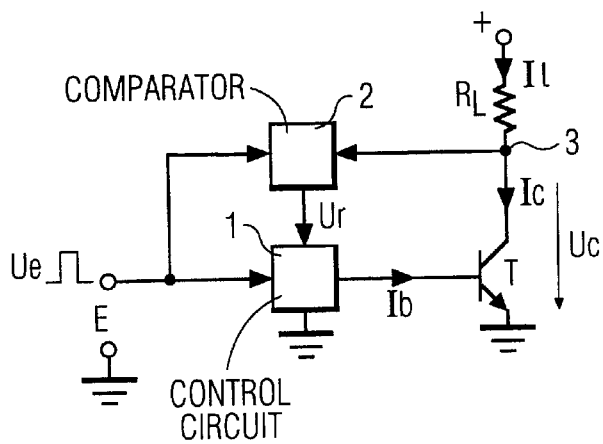
FIG. 1 is a block diagram of a prior art feedback circuit for controlling base saturation.
Figure 2:
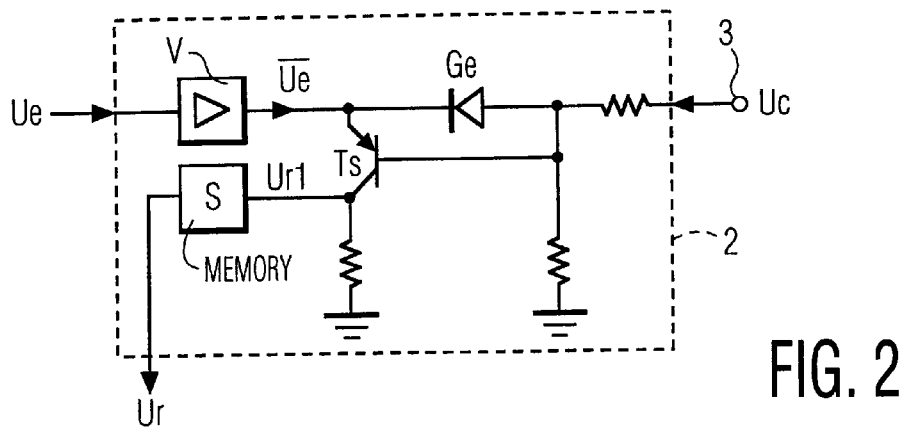
FIG. 2 is a detailed circuit representation of the comparator shown in FIG. 2.
Figure 3:
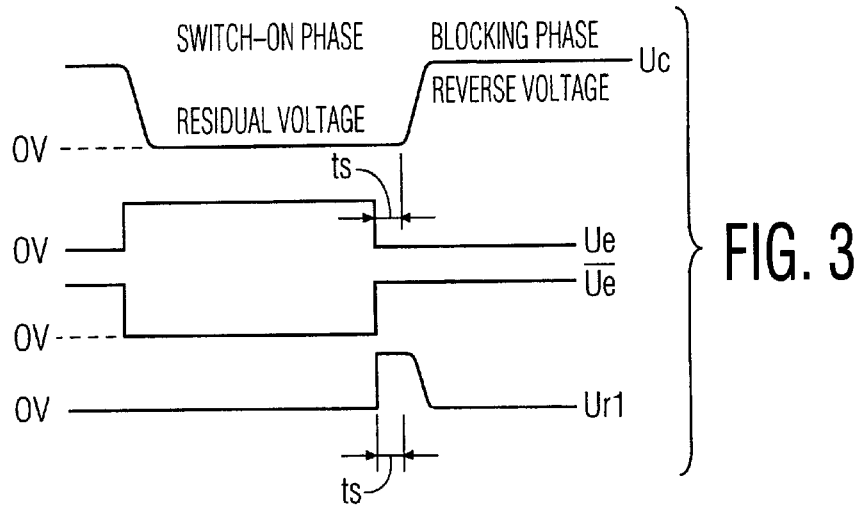
FIG. 3 shows voltage curves during switching of the transistor T in FIG. 1.
Figure 4:
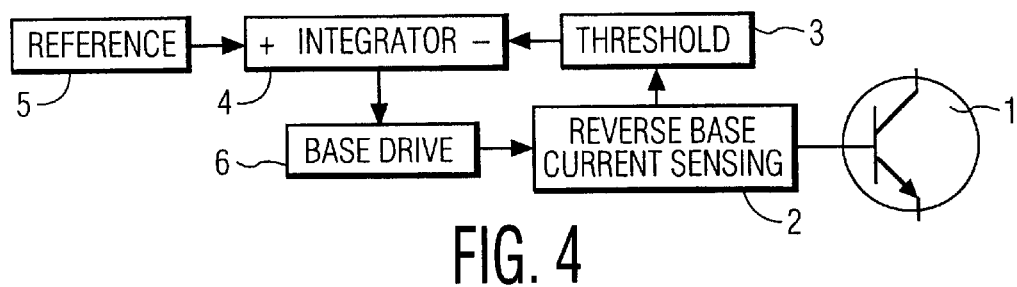
FIG. 4 is a block diagram of a feedback circuit for controlling base saturation in accordance with the invention.

FIG. 4 is a block diagram of a feedback circuit in accordance with this invention. A reverse base current sensing circuit 2 diverts the current flowing out of the base of the bipolar transistor during the transient turning off phase to a threshold circuit 3. Threshold circuit 3 removes the influence of the junction leakage current. The reverse base current which exceeds the threshold of threshold circuit 3 is supplied to an inverting input of an integrator 4. A noninverting input of the integrator 4 is supplied with a reference current from reference source 5. This reference current is used to set the saturation current of the transistor to a suitable lightly saturated condition. Since the integral of a current is a charge, the integrator 4 produces a signal proportional to the difference between a reference charge and the actual minority carrier charge stored in the collector prior to entry into the turning off phase. This signal is fed to a base drive circuit 6 which controls the amount of forward base drive delivered to the transistor 1 during the next conduction state in accordance with this signal.

If there is too much minority carrier charge stored in the collector, the integrator delivers a reduced signal to the base drive circuit 6 resulting in a forward base current that produces a reduced amount of minority carrier charge stored in the collector the next time the transistor is in the conduction state. If there is not enough minority carrier charge stored in the collector, the integrator delivers an increased signal to the base drive circuit 6 resulting in a forward base current that produces a higher minority carrier charge in the collector the next time that the transistor is in the conduction state. In this manner the control circuit maintains a desired optimum amount of minority carrier charge in the collector during the conduction states. This optimum amount of minority carrier charge is set by reference 5. The optimum minority carrier charge allows for a balancing between the switching and conduction losses and therefor a minimization of total losses.

Figure 5:
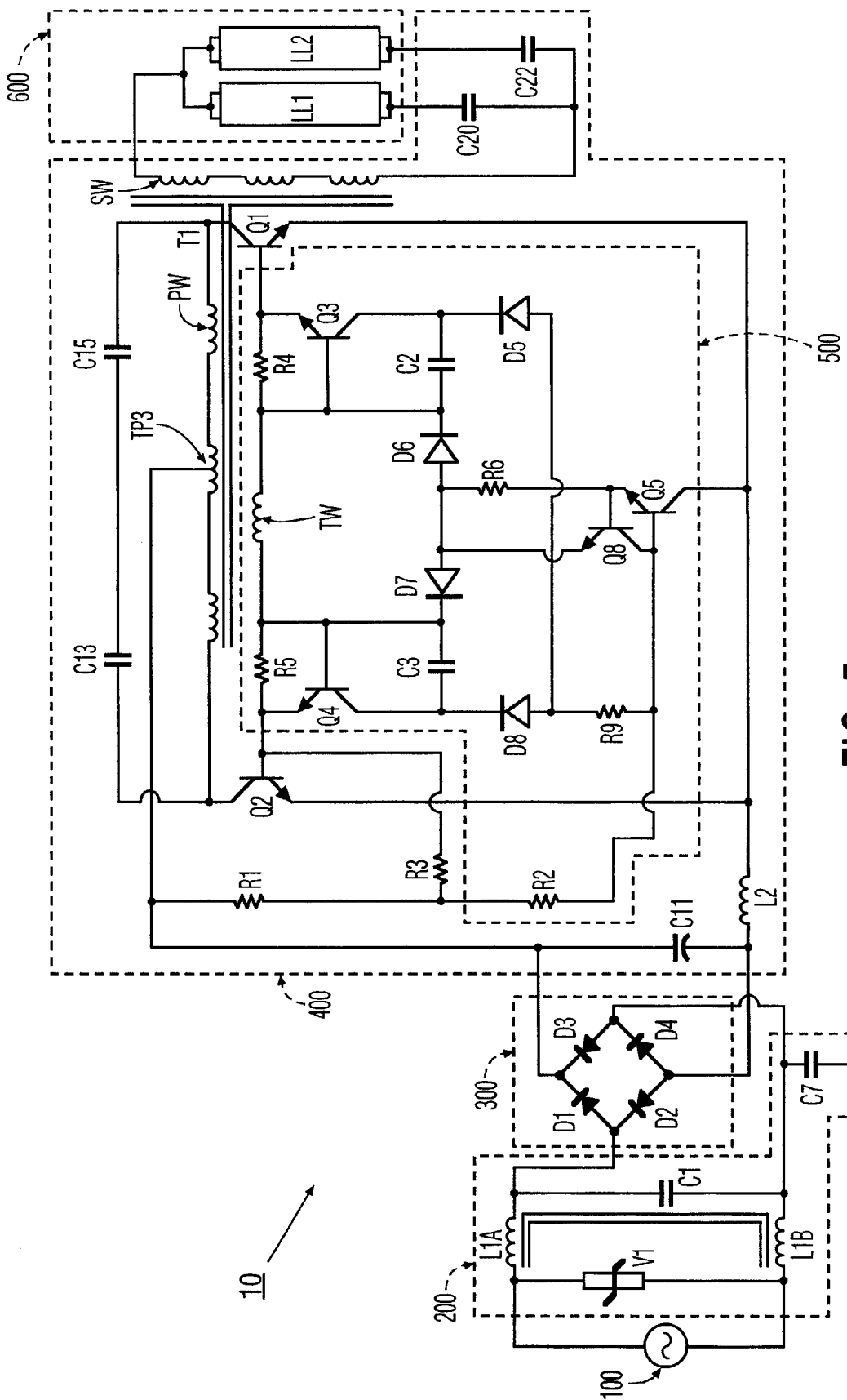
FIG. 5 is a schematic diagram of a ballast which includes a bipolar transistor base driving scheme in accordance with one embodiment of the invention.
Figure 6:
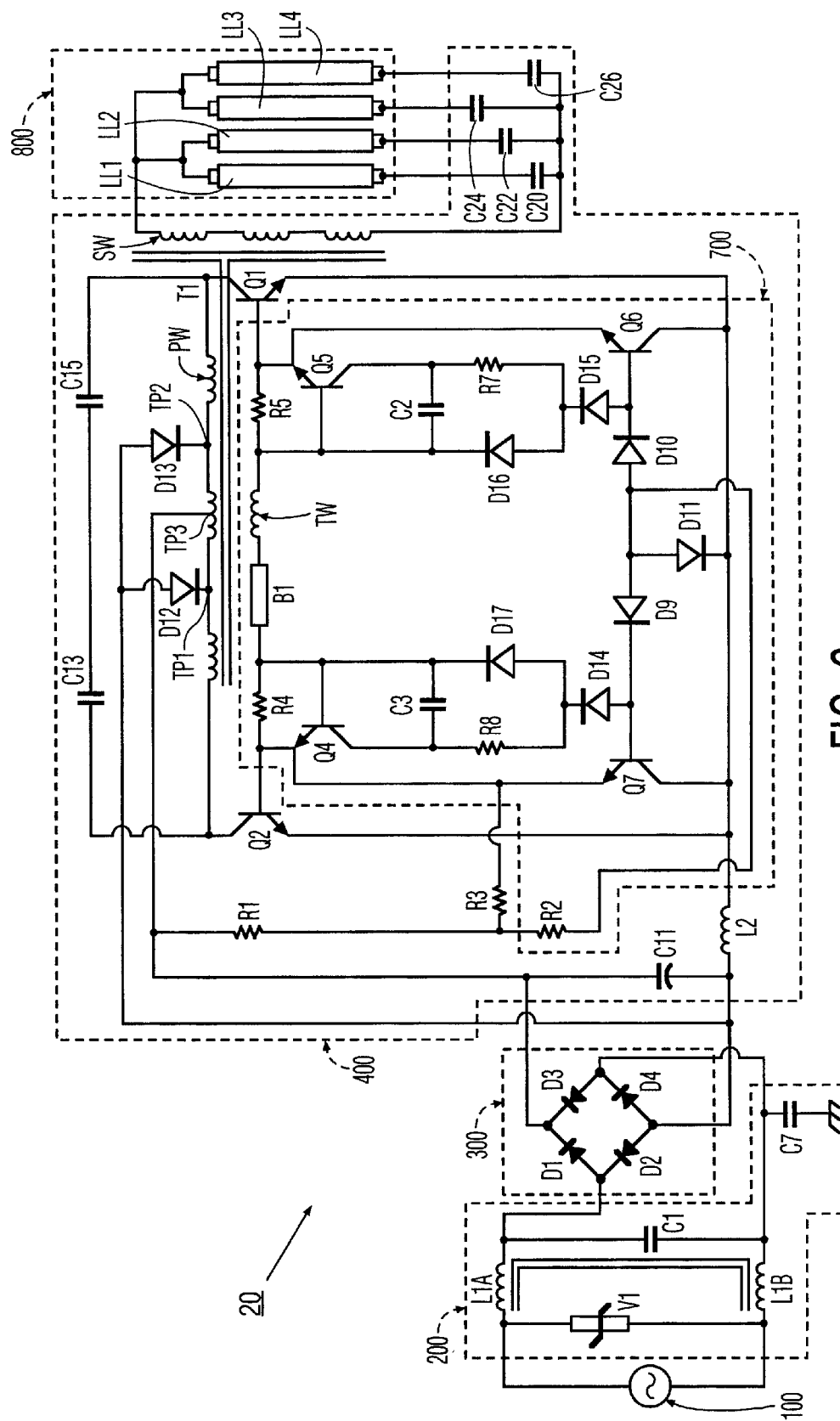
FIG. 6 is a schematic diagram of a ballast which includes a bipolar transistor base driving scheme in accordance with an alternative embodiment of the invention.

Preferred implementations of the block diagram shown in FIG. 4 are illustrated in FIGS. 5 and 6.

As shown in FIG. 5, a ballast 10, in accordance with a first embodiment of the invention, includes an electromagnetic interference (EMI) filter 200 for power factor correction and harmonic content reduction of an a.c. current drawn from an a.c. voltage source 100. Ballast 10 also includes a rectifier 300 for rectifying the filtered a.c. voltage, an inverter 400 for converting the rectified a.c. voltage produced by rectifier 300 into a high frequency a.c. voltage. Inverter 400 includes a base drive system 500 in accordance with this invention for driving a pair of bipolar power transistors Q1 and Q2 of inverter 400. The high frequency a.c. voltage produced by inverter 400 is supplied to a lamp load 600 for powering of the lamp load.

EMI filter 200 includes a varistor V1 which is connected to a first end of an inductor L1A and a first end of an inductor L1B. The other ends of inductors L1A and L1B are connected to either end of a capacitor C1. A capacitor C7 is connected at one end to the junction between inductor L1B and capacitor C1 and at its other end to earth ground (e.g. to a grounded ballast can). The output voltage of filter 200 is produced across capacitor C1 and is then rectified by rectifier 300.

Rectifier 300 includes four diodes D1, D2, D3 and D4. The anode of diode D1 and cathode of diode D2 are connected to the junction between inductor L1A and capacitor C1. The anode of diode D3 and cathode of diode D4 are connected at a first junction joining capacitors C1 and C7 and inductor L1B together. The cathodes of diodes D1 and D3 are connected together at a second junction. The anodes of diodes D2 and D4 are also connected together. The junctions between the cathodes of diodes D1 and D3 and the anodes of diodes D2 and D4 serve as the outputs of rectifier 300 and are connected to a buffer (e.g. electrolytic) capacitor C11, the latter of which is shown within inverter 400. Alternatively, capacitor C11 can be viewed as part of and across the output of rectifier 300.

Inverter 400, which is of the push-pull oscillator type, also includes an inductor L2 connected at one end to the junction joining capacitor C11 and the anodes of diodes D2 and D4 together. A resistor R1 is connected to the junction joining capacitor C11, the cathodes of diodes D1 and D3 and a center tap TP3 of an inductor PW together. Inductor PW serves as the primary winding of a transformer T1. The other end of resistor R1 is connected to a first end of a resistor R2 and to a first end of a resistor R3. Resistor R2 sets a reference current and corresponds to the reference source 5 in FIG. 4. The other end of inductor L2 is connected to an emitter of a bipolar NPN transistor Q2, a collector of an NPN transistor Q5 and an emitter of a bipolar NPN transistor Q1. The other end of resistor R3 is connected to a base of transistor Q2, an emitter of a bipolar NPN transistor Q4 and one end of a resistor R5.

The other end of resistor R2 is connected to the junction joining a base of transistor Q5, a collector of an NPN transistor Q8 and a resistor R9. The anodes of a pair of diodes D5 and D8 are connected to the other end of resistor R9. The emitter of transistor Q5 is connected to one end of a resistor R6 and a base of transistor Q8. The other end of resistor R6 is connected to the anodes of a pair of diodes D6 and D7 and an emitter of transistor Q8. The cathode of diode D6 is connected to one end of a capacitor C2, a base of a bipolar NPN transistor Q3, one end of an inductor TW and one end of a resistor R4. Inductor TW, which is the tertiary winding of a transformer T1, is commonly referred to as the base winding (i.e. the base winding for supplying power to the bases of transistors Q1 and Q2). The other end of capacitor C2 is connected to the cathode of diode D5 and a collector of transistor Q3. The emitter of transistor Q3 is connected to the other end of resistor R4 and a base of transistor Q1.

The cathode of diode D7 is connected to one end of a capacitor C3, a base of transistor of Q4, the other end of resistor R5 and the other end of tertiary winding TW of transformer T1. The other end of capacitor C3 is connected to the cathode of diode D8 and a collector of transistor Q4. Resistors R2, R4, R5, R6 and R9, diodes D5, D6, D7 and D8, capacitors C2 and C3, tertiary winding TW of transformer T1 and transistors Q3, Q4 and Q8 serve together as base drive circuit 500 for bipolar transistors Q1 and Q2 as further discussed below.

Connected to a collector of transistor Q2 is a first end of a capacitor C13 and a first end of primary winding PW. The other end of capacitor C13 is connected to one end of a capacitor C15. The other end of capacitor C15 is connected to a collector of transistor Q1 and the other end of primary winding PW.

A secondary winding SW of transformer T1 is connected at one end to a pair of first ends of a capacitor C20 and a capacitor C22. The other ends of secondary winding SW and capacitors C20 and C22 serve as the outputs for inverter 400 to which lamp load 600 is connected. Lamp load 600 includes a pair of fluorescent lamps LL1 and LL2.

Ballast 10 operates as follows. Varistor V1 serves as a current protection/limiting device for ballast 10. Inductors L1A and L1B and capacitor C1 serve as a filter for power factor correction and harmonic content reduction of the a.c. current drawn by filter 200 from voltage source 100. Capacitor C7 of filter 200 serves as a common mode capacitor to ground. The output of filter 200, that is, the voltage across capacitor C1, is supplied to rectifier 300 for rectification of the a.c. voltage across capacitor C1. The rectified a.c. voltage produced by rectifier 300 is stored across buffer (e.g. electrolytic) capacitor C11. The peak voltage across capacitor C1 appears across capacitor C11. The voltage across capacitor C11 serves as the bus voltage for inverter 400. Typically, the bus voltage is about 150 volts or about 345 volts when the voltage applied to filter 200 by voltage source 100 is about 120 volts or about 277 volts, respectively. The bus voltage is applied to center tap TP3 of primary winding PW.

Inductor L2 serves as a current radio frequency choke providing constant current to inverter 400. Capacitors C20 and C22 serve as ballasts for lamps LL1 and LL2, respectively. Typically, the voltage across secondary winding SW of transformer T1 is about 550 volts RMS; the lamp current flowing through each of capacitors C20 and C22 being approximately 180 milliamperes at steady state full load conditions.

Primary winding PW resonates with capacitors C13 and C15 to produce a desired resonant tank/tuned oscillating frequency. Transistors Q1 and Q2 are switched by base drive system 500 for refreshing capacitors C13 and C15 and primary winding PW of the resonant tank circuit.

The ignition scheme for starting the resonant tank circuit (i.e. initiating oscillation) includes resistors R1 and R3. Current flows through resistors R1 and R3 for proper bias of transistors Q1 and Q2 in initiating oscillation of the resonant tank circuit (i.e. for initial switching of transistors Q1 and Q2).

Capacitors C2 and C3 are associated respectively with bipolar transistors Q2 and Q1 and serve to produce and hold a control voltage associated with these respective transistors. More specifically, capacitors C2 and C3 control the base drive circuit transistor Q5 that produces a drive current for the transistors Q2 and Q1 when each alternately is in its conduction state. Capacitors C2 and C3 are partially discharged alternately by minority carrier charge flowing out of the base of transistors Q2 and Q1 respectively during the respective turning off phases of each. Feedback transistors Q3 and Q4 are associated with capacitors C2 and C3 respectively to direct the reverse base current of each of the associated transistors Q2 and Q1 respectively to discharge the capacitors C2 and C3. Capacitors C2 and C3 are partially charged by forward base current flowing into transistors Q2 and Q1 respectively during the respective conduction states of each. The voltages across capacitors C2 and C3 thus drop somewhat during each partial discharge thereof by flowing minority carrier charge from reverse base current of the associated transistor Q2 and Q1 respectively, and increase somewhat during each partial charging thereof by flowing forward base current to the associated transistor Q2 and Q1 respectively. These voltages do not drop to zero volts during normal operation, but instead reach a quasi steady state where there is a small drop and a small rise in voltage during each cycle that balance each other. The discharged level of the voltages on C2 and C3 are the control voltage that limit the forward base drive current applied by transistor Q5 to the bases of transistors Q2 and Q1 respectively.

Capacitors C2 and C3 are increased in charge and decreased in charge at alternate times. There are no periods of time when capacitors C2 and C3 are both increasing in charge or when both capacitors C2 and C3 are both decreasing in charge. Following a decrease in charge due to a reverse base current, capacitors C2 and C3 are neither charging nor discharging (referred to hereinafter as "idling") and the associated transistor Q2 and Q1 respectively is in an off state. The operational sequence of each capacitor C2 and C3 includes charging (during approximately ½ of each oscillation cycle corresponding to forward base current of the associated bipolar transistor during the conduction state) followed by discharging (during approximately ¹⁄₂₀ of each oscillation cycle corresponding to the reverse base current of the same bipolar transistor in the turning off transitional phase) followed by idling (during approximately ½ of each oscillation cycle corresponding to the off state of the corresponding same bipolar transistor) before repeating the foregoing sequence.

Capacitor C2 (corresponding to transistor Q2) begins to increase its charge once transistor Q1 is completely turned OFF and continues to increase charge until transistor Q2 begins to turn OFF. Current for charging capacitor C2 flows from capacitor C11 through resistors R1, R2 and R9, diode D5, capacitor C2, tertiary winding TW, resistor R5, base-emitter junction of transistor Q2 and inductor L2 before returning to capacitor C11. The forward base current for switching transistor Q2 is based on the voltage across capacitor C2 as further explained below.

Capacitor C3 (corresponding to transistor Q1) begins to increase charge once transistor Q2 is completely turned OFF and continues to increase charge until transistor Q1 begins to turn OFF. Current for charging of capacitor C3 flows from capacitor C11 through resistors R1, R2 and R9, diode D8, capacitor C3, tertiary winding TW, resistor R4, the base-emitter junction of transistor Q1 and inductor L2 before returning to capacitor C11. The forward base current for transistor Q1 is based on the voltage across capacitor C3 as further explained below.

As transistor Q2 or Q1 is being turned OFF, a large spike of reverse base current from the transistor being turned OFF sufficient for turning ON the other transistor (Q1 or Q2) is sensed by resistor R4 or R5, respectively. The voltage developed across resistor R4 or R5, as transistor Q2 or transistor Q1 begins to turn OFF, is sufficient to turn ON feedback transistors Q3 or Q4, respectively. These transistors Q3 and Q4 are implementing (in part) the reverse base current sensing circuit 2 of FIG. 4. The threshold 3 represented in FIG. 4 is implemented in this circuit as the base-emitter voltage of Q3 and Q4.

The reverse base current of transistor Q2 or Q1 now flows, in part, through the emitter-collector path of transistor Q4 or Q3, respectively. For each oscillation of the resonant tank circuit, discharge current from capacitor C3 flows along a path which includes the collector-emitter path of transistor Q4, the base-collector junction of transistor Q2, primary winding PW, the collector-base junction of transistor Q1, resistor R4 and tertiary winding TW before returning to capacitor C3. Similarly, during each oscillation of the resonant tank circuit, discharge current from capacitor C2 flows along a path which includes the collector-emitter path of transistor Q3, base-collector junction of transistor Q1, primary winding PW, collector-base junction of transistor Q2, resistor R5 and tertiary winding TW before returning to capacitor C2. It should be appreciated that while the above-described paths correctly describe the transient discharge paths of discharge current from capacitors C2 and C3, there are other currents flowing in the circuitry at the same time. Transistors Q2 and Q1 respectively are turning on at the same time that transistors Q1 and Q2 respectively are turning off (in their turning off phase). Accordingly, the total current flowing through transistors Q2 and Q1 during the turning off phase of the other transistor Q1 and Q2 respectively also includes a larger current component flowing in an opposite direction through a path from collector to emitter, due to the fact that transistor Q2 and Q1 are turning on at the same time that the capacitor of the opposite transistor is discharging through the base collector path thereof.

During one-half of each oscillation cycle of the resonant tuned circuit, capacitor C3 serves to set the voltage across resistor R6. During the other half cycle of oscillation of the resonant tuned circuit, capacitor C2 serves to set the voltage across resistor R6. The voltage across resistor R6 set by capacitor C3 is designed to be approximately equal to the sum of the voltages across capacitor C3 and resistor R9 less the voltage drop across diode D7. Similarly, the voltage developed across resistor R6 during the other half cycle of oscillation is designed to be approximately equal to the sum of the voltages across capacitor C2 and resistor R9 less the voltage drop across diode D6. In this way the voltage on capacitors C2 and C3 alternately act as control voltages for limiting or controlling the forward base drive current for transistors Q2 and Q1 respectively.

During one-half of each oscillation cycle, capacitor C3 controls (i.e. establishes) the voltage developed across and therefore the current flowing through resistor R6. During the other half cycle of each oscillation, capacitor C2 controls (i.e. establishes) the voltage developed across and therefore the current flowing through resistor R6.

Shortly after the resonant tank circuit begins to oscillate, a voltage of sufficiently high amplitude develops across the resonant tank circuit to turn ON transistor Q5. Current for forward biasing of transistor Q2 flows from tertiary winding TW along a path which includes resistor R5, the base-emitter junction of transistor Q2, the collector-emitter path of transistor Q5, resistor R6 and diode D6 before returning to tertiary winding TW. Current for forward biasing of transistor Q1 flows from tertiary winding TW along a path which includes resistor R4, the base-emitter junction of transistor Q1, the collector-emitter path of transistor Q5, resistor R6 and diode D7 before returning to tertiary winding TW. In other words, current for forward biasing by the transistor Q1 or Q2 always flows through resistor R6. By controlling the current flowing through resistor R6, capacitors C2 and C3 control the forward base drive of transistors Q1 and Q2, respectively. The average voltage across capacitors C2 and C3 is maintained at a relatively constant value during steady-state operation of lamp load 600.

Of particular importance are the two self-correcting feedback circuits for maintaining transistors Q1 and Q2 in relatively lightly saturated, conductive states. The discharge paths of capacitors C2 and C3 serve as respective feedback circuits. The first feedback path (i.e. discharge path of capacitor C3) includes the collector-base junction and therefore the minority carrier charge stored in a collector of transistor Q1. When more or less current flows into the base of transistor Q1 during a push-pull cycle, the amount of minority carrier charge stored in the collector of transistor Q1 varies. During discharge of capacitor C3 such variation in stored minority carrier charge of collector Q1 is reflected in the level to which capacitor C3 discharges. For example, when transistor Q1 is temporarily driven into deep saturation due to a reduction in power consumed by lamp load 600, the minority carrier charge of the collector of transistor Q1 increases thereby lowering the level of voltage to which capacitor C3 discharges. When the power consumed by lamp load 600 increases, the minority carrier charge stored in the collector of transistor Q1 decreases thereby raising the voltage level to which capacitor C3 discharges.

Similarly, the voltage across capacitor C2 following discharge reflects changes in the amount of minority carrier charge stored in the collector of transistor Q2 based on variations in power consumption of lamp load 600. When transistor Q2 is temporarily driven into deep saturation due to a reduction in power consumed by lamp load 600, the minority carrier charge of the collector of transistor Q2 increases thereby lowering the level of voltage to which capacitor C2 discharges. When the power consumed by lamp load 600 increases, the minority carrier charge in the collector of transistor Q2 decreases thereby raising the voltage level to its capacitor C2 discharges.

Transistor Q8 limits the current flowing through resistor R6 during the separate charging of capacitors C2 and C3. When the voltage across resistor R6 is sufficient to turn ON transistor Q8, a portion of the current flowing into the base of transistor Q5 is now diverted through the collector-emitter path of transistor Q8 into the junction joining the anode of diodes D6 and D7 and resistor R6 together. By limiting the flow of current into the base of transistor Q5, the emitter current of transistor Q5 during forward biasing of transistors Q1 and Q2 is limited to a predetermined level.

The voltage across resistor R6 is designed to be greater than the voltage across resistor R5 during forward biasing of transistor Q2 and to be greater than the voltage across resistor R4 during forward biasing of transistor Q1. The voltage developed across resistor R6 is limited by transistor Q8 (i.e. limited by the level of transistor Q5 emitter current) so that the voltage developed across resistor R5 during charging of capacitor C2 is insufficient to turn ON transistor Q4. By preventing transistor Q4 from being turned ON, discharging of capacitor C3 during charging of capacitor C2 is prevented. Similarly, the voltage developed across resistor R4 during charging of capacitor C3 is insufficient to turn ON transistor Q3. Discharge of capacitor C2 during charging of capacitor C3 is therefore prevented.

By preventing capacitor C2 from discharging while capacitor C3 is being charged, transistor Q8 serves to stabilize oscillator operation. That is, transistor Q8 prevents the untimely discharge of capacitor C3 imposing a very low voltage across resistor R6 resulting in a level of transistor Q1 forward base current being too low to turn ON transistor Q1. There is no change in the voltage across capacitor C2 during charging and discharging of capacitor C3. Transistor Q8 also prevents capacitor C3 from discharging while capacitor C2 is being charged and therefore serves to stabilize oscillator operation during the charging of capacitor C2. That is, transistor Q8 prevents the untimely discharge of capacitor C2 imposing a very low voltage across resistor R6 resulting in a level of transistor Q2 forward base current being too low to turn ON transistor Q2. There is no change in the voltage across capacitor C3 during charging and discharging of capacitor C2. Transistor Q8 can also be viewed as diverting the flow of current away from capacitors C2 and C3 during charging of these capacitors.

Resistor R9 serves to control the shape of the voltage waveform across resistor R6 to permit transistors Q1 and Q2 to be driven into deeper saturation (i.e. smaller emitter-collector voltage drop) so as to decrease transistor conduction losses.

In accordance with an alternative embodiment of the invention, a ballast 20, as shown in FIG. 6, is similar in construction and operation to ballast 10 of FIG. 5. Those elements of ballasts 10 and 20 of similar construction and operating in a similar manner have been identified by like reference numerals and will not be further discussed herein. The differences between ballast 20 and ballast 10 relate to the protection of transistors Q1 and Q2 and the discharge (feedback) and charging paths of capacitors C2 and C3.

Base driving circuit 700 of ballast 20 includes resistor R2 connected to the anodes of diodes D9, D10 and D11. The cathode of diode D11 is connected to the junction joining one end of inductor L2, the collectors of a pair of bipolar NPN transistors Q6 and Q7 and the emitters of transistors Q1 and Q2 together. The cathode of diode D9 is connected to the anode of a diode D14 and the base of transistor Q7. The cathode of diode D10 is connected to the anode of a diode D15 and the base of transistor Q6. The emitter of transistor Q7 is connected to the junction joining the base of transistor Q2, resistors R3 and R5 and the emitter of transistor Q4 together. The emitter of transistor Q6 is connected to the emitter of transistor Q3, the base of transistor Q1 and one end of resistor R4.

The cathode of diode D14 is connected to one end of a resistor R8 and the anode of a diode D17. The other end of resistor R8 is connected to one end of capacitor C3 and the collector of transistor Q4. The cathode of diode of D17 is connected to the junction joining capacitor C3, the base of transistor Q4, resistor R5 and a ferrite bead B1 together. The other end of ferrite bead B1 is connected to one end of tertiary winding TW.

The cathode of diode D15 is connected to the anode of diode D16 and one end of a resistor R7. The cathode of diode D16 is connected to the junction joining capacitor C2, the base of transistor Q3, tertiary winding TW and resistor R4 together. The other end of resistor R7 is connected to the junction joining capacitor C2 and the collector of transistor Q3 together.

Resistors R2, R4, R5, R7 and R8, diodes D9, D10, D11, D14, D15, D16 and D17, capacitors C2 and C3, transistors Q3, Q4, Q6 and Q7, ferrite bead B1 and tertiary winding TW in combination serve as a base drive circuit 700 for switching ON and OFF transistors Q1 and Q2.

Aside from base drive circuit 700, ballast 20 also differs from ballast 10 in that the junction joining the anodes of diodes D2 and D4 and inductor L2 together is also connected through a pair of diodes D12 and D13 to a pair of taps TP1 and TP2 of primary winding PW, respectively. Ballast 20 is capable of powering a lamp load 800 which includes fluorescent lamps LL1, LL2, LL3 and LL4. Ballast 20 includes capacitors C20, C22, C24 and C26 for ballasting lamps LL1, LL2, LL3 and LL4, respectively.

Operation of ballast 20 is substantially the same as previously described with respect to ballast 10 in that capacitors C2 and C3 provide control voltages for establishing (controlling) the forward base current supplied to transistors Q2 and Q1, respectively. Current for charging capacitor C3 flows from capacitor C11 through resistors R1 and R2, diodes D9 and D14, resistor R8, capacitor C3, ferrite bead B1, tertiary winding TW, resistor R5, base-emitter junction of transistor Q1 and inductor L2 before returning to capacitor C11. Current for charging capacitor C2 flows from capacitor C11 through resistors R1 and R2, diodes D10 and D15, resistor R7, capacitor C2, tertiary winding TW, ferrite bead B1, resistor R4, base-emitter junction of transistor Q2 and inductor L2 before returning to capacitor C11.

The discharge (feedback) path of capacitor C3 includes the loop formed by capacitor C3, collector-emitter path of transistor Q4, base-collector junction of transistor Q2, primary winding PW, collector-base junction of transistor Q1, resistor R5, tertiary winding TW and ferrite bead B1. The discharge (feedback) path of capacitor C2 includes the loop formed by capacitor C2, collector-emitter path of transistor Q5, base-collector junction of transistor Q1, primary winding PW, collector-base junction of transistor Q2, resistor R4, ferrite bead B1 and tertiary winding TW. As with ballast 10, the discharge paths through transistors Q2 and Q1 via the base-collector junctions represent only a portion of the current flowing through these junctions. A much larger current is flowing also in the other direction into the collector at the same time due to the fact that these transistors are also turning on at the same time that the discharge current is flowing in the indicated opposite direction. Thus the discharge current represents only a reduction in the forward current flowing into the collector and flowing towards the emitter. There is no net current flowing out of the collector of transistors Q2 and Q1 due to the discharge of capacitors C3 and C2 respectively.

Ballast 20 eliminates the need for resistor R6 of ballast 10 by now having capacitors C2 and C3 control the voltages across resistors R5 and R4, respectively. In other words, resistors R4 and R5 now each serve two purposes. Similar to ballast 10, resistors R4 and R5 determine when to turn ON transistors Q5 and Q4 for initiating discharge of capacitors C2 and C3 for purposes of feedback as discussed above, respectively. Additionally, resistors R4 and R5 are also used to determine the level of forward base current for transistors Q2 and Q1 by capacitor C2/resistor R7 and capacitor C3/resistor R8 controlling the voltages developed across resistors R5 and R4, respectively.

The forward base current flowing into the base of transistor Q1 also flows through and is determined based on the voltage developed across resistor R4. The voltage developed across resistor R4 is designed to be substantially equal to the voltage across the series combination of resistor R8 and capacitor C3. The forward base current flowing into transistor Q2 also flows through and is determined based on the voltage developed across resistor R5. The voltage developed across resistor R5 is designed to be substantially equal to the voltage across the series combination of resistor R7 and capacitor C2.

By including resistor R8, the shape of the voltage waveform developed across resistor R4 also can be changed to permit transistor Q1 to be driven into deeper saturation (i.e. smaller emitter-collector voltage drop) so as to decrease conduction loss of transistor Q1. Similarly, resistor R7 also serves to reshape the voltage waveform developed across resistor R5 to permit transistor Q2 to be driven into deeper saturation so as to reduce conduction loss of transistor Q2. As can readily be appreciated, in an alternative embodiment of the invention resistors R7 and R8 can be short-circuited provided higher conduction losses can be tolerated.

Ballast 20 unlike ballast 10 also includes ferrite bead B1, that is, an inductor. Ferrite bead B1 serves to increase the rise time of the current spike created by the flow of reverse base current of transistor Q1 or Q2 flowing through tertiary winding TW. The increased rise time permits removal more efficiently of minority carriers stored in the collector of the transistor (i.e. Q1 or Q2) which is being turned OFF. There are therefore less switching losses in the collector when the transistor is turned OFF.

Diode D17 limits the voltage across the series combination of capacitor C3 and resistor R8 during charging and discharging of capacitor C3. The voltage across diode D17 is designed to be equal to the voltage across resistor R4. Since the voltage across resistor R4 is limited to the threshold voltage of diode D17, the voltage developed across resistor R4 during charging and discharging of capacitor C3 is insufficient to turn ON transistor Q5 and thereby permit discharge of capacitor C2. In other words, diode D17 prevents capacitor C2 from discharging when capacitor C3 is being charged and therefore serves to stabilize oscillator operation (i.e. prevent the push-pull oscillator from being turned OFF). There is no change in the voltage across capacitor C2 during charging and discharging of capacitor C3, that is, the voltage across capacitor C2 is maintained at the same level during its idling state.

Diode D16, similar to diode D17, prevents capacitor C3 from discharging when capacitor C2 is being charged. More particularly, the voltage across capacitor C2 and resistor R7 is limited to the threshold voltage of diode D16 during charging of capacitor C2. The voltage across resistor R5 is designed to be equal to the voltage across diode D16 and therefore can never exceed the threshold voltage of diode D16 when capacitor C2 is being charged. Therefore, when capacitor C2 is being charged, transistor Q4 cannot be turned ON and therefore prevents discharge of capacitor C3. In other words, capacitor C3 is prevented from discharging when capacitor C2 is being charged and therefore serves to stabilize oscillator operation (i.e. prevents oscillator from being turned OFF). There is no change in the voltage across capacitor C3 during charging and discharging of capacitor C2, that is, the voltage across capacitor C2 is maintained at the same level during its idling state.

The source of current for forward biasing transistor Q1 is produced by tertiary (base) winding TW. The path of forward base current for transistor Q1 flows from tertiary winding TW through resistor R5 through the base-emitter junction of transistor Q1, the collector-emitter path of transistor Q7, resistor R4 and ferrite bead B1 before returning to tertiary winding TW. The forward base current for transistor Q2, which is also produced by tertiary TW, flows from tertiary winding TW through ferrite bead B1, resistor R4, base-emitter junction of transistor Q2, collector-emitter path of transistor Q6 and resistor R5 before returning to tertiary winding TW.

Diode D12 will turn ON when the voltage developed between taps TP1 and TP3 of primary winding PW exceeds the voltage across capacitor C11. Similarly, diode D13 will turn ON when the voltage between taps TP2 and TP3 is greater than the voltage across capacitor C11. Consequently, the magnetizing current of primary winding PW is diverted to capacitor C11 whenever the voltage difference between the collectors of transistors Q1 and Q2 exceeds a predetermined level. Any undesired voltages (e.g. voltage spikes) which appear across primary winding PW are diverted from transistors Q1 and Q2 thereby protecting these transistors.

In accordance with yet another alternative embodiment of the invention, resistor R2 can be short-circuited, diode D11 can be open circuited and diodes D9 and D10 can be replaced with a corresponding pair of resistors in order to reduce the number of components and particularly the number of diodes required. As can also be readily appreciated, the source for biasing transistors Q6 and Q7 need not be derived from the junction formed by capacitor C11 and the cathodes of diodes D1 and D3. For example, biasing of transistors Q6 and Q7 can be provided from the junction between the collectors of transistors Q6 and Q7 or from a tap of inductor L2.

As now can be readily appreciated, ballast 10 and ballast 20 each provide two discharge/feedback paths which are independent of one another. Transistors Q1 and Q2 need not have the same characteristics, such as, but not limited to, current gain, storage time or saturation voltage.

Unlike conventional base driving schemes in which high switching losses can occur during no load conditions, the present invention by sensing changes in the minority carrier charge stored in the collectors of the power transistors avoids deep saturation of the power transistors. Switching losses during no load conditions are therefore minimized.

Power losses associated with transistors Q1 and Q2 regardless of load conditions are mnimized. Base drive circuits 500 and 700 can accommodate a wide range of input voltages while maintaining lossless operation with minimum loss of power during switching of transistors Q1 and Q2. Ballasts 10 and 20 substantially eliminate overshoot of tank voltage when the resonant tank is turned ON. The need for a Baker clamp (and the relatively high power losses accompanying the Baker clamp) is eliminated by base drive circuits 500 and 700. Losses in base drive circuits 500 and 700 are relatively lower than in a conventional base driving scheme inasmuch as the level of current required to drive the power transistors is maintained at a relatively lower level.

Base drive circuits 500 and 700 also do not employ a proportional driving scheme, that is, maintaining a constant, forced current gain for the power transistors. The forced current gain of transistor Q1 and/or Q2 can vary based on and to accommodate variations in lamp load 600 or 800 and/or transistor characteristics.

The base driving scheme in accordance with the present invention provides base current to individual power switching bipolar transistors. The amount of forward base drive is dependent on lamp load 600 or 800. In other words, the switching characteristics vary based on lamp load 600 or 800 in response to detection of lightly saturated conditions of transistors Q1 and Q2. Detection of such lightly saturated conditions is based on detection of a signal representing the storage of collector minority carriers in either transistor Q1 or Q2. This signal flows within the feedback path during discharge of the associated reference capacitor (i.e. capacitor C2 or C3).

The base driving scheme in accordance with the invention therefore results in switching of bipolar transistors much more quickly by reducing the amount of stored minority carriers within the power transistors. Advantageously, the switching times of the bipolar transistors approach the switching times of a field effect transistor (FET).

It will thus been seen that the objects set forth above, among those made apparent from the preceding description, are efficiently attained and since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A driving circuit for a pair of bipolar transistors in a push-pull circuit wherein each said bipolar transistor has a base and collector and stores a minority carrier charge in the collector during a conduction state thereof, each said bipolar transistor oscillating between the conduction state and an off state and having a transitional turning off phase following said conduction state and preceding said off state, comprising:

a respective capacitor associated with said each bipolar transistor and connected so as to charge during the conduction state of said associated bipolar transistor at a rate determined by the magnitude of current supplied to the base of said associated bipolar transistor during the conduction state thereof to produce a control voltage across said separate capacitor;

at least one current source transistor associated with said bipolar transistors and connected to supply current to the bases of said bipolar transistor during the conduction state thereof at a magnitude determined by the control voltage across said separate capacitor associated with said each bipolar transistor; and a feedback transistor associated with said each bipolar transistor and connected so as to partially discharge said separate capacitor associated with said each bipolar transistor during the turning off phase thereof by an amount determined by the amount of minority carrier charge stored in the collector of said associated bipolar transistor during the conduction state preceding said turning off phase, whereby the base current supplied to said each bipolar transistor by the current source transistor associated with said each bipolar transistor decreases as the minority carrier charge stored in the collector of said each bipolar transistor during its conduction state increases.

2. The driving circuit of claim 1, wherein the feedback transistor associated with said each bipolar transistor is responsive to termination of the conduction state of said each bipolar transistor for directing reverse base current to the associated capacitor.

3. The driving circuit of claim 2, wherein the feedback transistor associated with said each bipolar transistor has a base and collector and is connected such that the capacitor associated with said each bipolar transistor is coupled across the base and collector of the feedback transistor.

4. The driving circuit of claim 1, wherein the at least one current source transistor controls the level of current supplied to the base of said each bipolar transistor.

5. The driving circuit of claim 4, wherein the level of current supplied to the base of said each bipolar transistor by said at least one current source transistor is proportional to the control voltage across the associated capacitor.

6. A driving circuit for a pair of bipolar transistors in a push-pull circuit, said bipolar transistors each alternately turning on and off out of phase with each other, and wherein said each bipolar transistor has a base and stores a minority carrier charge during a conduction state thereof that is removed through said base when said each bipolar transistor is turned off, comprising:

a respective capacitor associated with said each bipolar transistor, said separate capacitor charging while the associated bipolar transistor is turned on for producing a control voltage across said separate capacitor that is associated with said each bipolar transistor;

means for supplying current to the base of said each bipolar transistor when turned on that is based upon said control voltage associated with said each bipolar transistor; and a separate feedback transistor associated with said each bipolar transistor for receiving reverse base current over a threshold level when said each bipolar transistor turns off for partially discharging said separate capacitor, whereby the control voltage produced by said capacitor associated with said each bipolar transistor decreases as the amount of minority carrier charge stored in said each bipolar transistor when turned on increases, thereby controlling the base current supplied to said each bipolar transistor so as to limit saturation of said each bipolar transistor.

7. A method for driving a pair of transistors in a push-pull circuit, said transistors each alternately turning on and off out of phase with each other, and wherein said each transistor has a base and stores a minority carrier charge while turned on that is removed through said base when said each transistor is turned off, comprising the steps of:

producing a respective control voltage for each of said transistors by charging a separate capacitor associated with said each transistor while said each transistor is turned on and partially discharging said separate capacitor by an amount determined by the amount of minority carrier charge removed through said base of said each transistor each time said each transistor is turned off; and supplying current to the base of said each transistor when turned on that is based upon said separate control voltage for said each transistor, whereby the produced control voltage for said each transistor decreases as the minority carrier charge stored in said each transistor when turned on increases, thereby controlling the base current supplied to said each transistor so as to limit saturation of said each transistor.

8. A driving circuit for a bipolar transistor wherein said bipolar transistor has a base and collector and stores a quantity of minority carrier charge in the collector during a conduction state thereof, said bipolar transistor oscillating between the conduction state and an off state and having a transitional turning off phase following said conduction state and preceding said off state, comprising:

an integrator responsive to reverse base current flowing out of the base of said transistor during said turning off phase for measuring the quantity of minority carrier charge stored in said transistor during a previous conduction state; and a base drive circuit connected to supply current to the base of said bipolar transistor during the conduction state thereof at a magnitude determined by the quantity of minority carrier charge measured by said integrator, the base current supplied to said bipolar transistor by the base drive circuit decreasing as the quantity of minority carrier charge measured by said integrator increases.

9. A driving circuit as defined in claim 8 and further comprising:

a reverse base current sensing circuit for detecting reverse base current flowing out of the base of said bipolar transistor during said turning off phase and for directing detected reverse base current to said integrator.

10. A driving circuit as defined in claim 9 wherein said reverse base current sensing circuit comprises a feedback transistor.

11. A driving circuit as defined in claim 9 and further comprising:

a threshold circuit connected between said reverse base current sensing circuit and said integrator for subtracting a threshold current from said detected reverse base current to remove the influence of junction leakage current from said detected reverse base current to produce a current for said integrator determined only by flow of minority carrier charge from said bipolar transistor.

12. A driving circuit as defined in claim 8 and further comprising a reference signal applied to said integrator for controlling a nominal quantity of minority carrier charge to be stored in said bipolar transistor during its conduction state.

13. A driving circuit as defined in claim 8 wherein said integrator comprises a capacitor and the amount of charge on said capacitor is determined by the minority carrier charge stored in said bipolar transistor during its previous conduction state.

14. A driving circuit as defined in claim 13 wherein a charge on said capacitor is modified in one direction during each turning off phase by an amount proportional to the quantity of minority carrier charge stored in said bipolar transistor during the previous conduction state and modified in an opposite direction during each conduction state by an amount proportional to the base driving current of said bipolar transistor.

15. A driving circuit as defined in claim 14 wherein said one direction is the direction of decrease.

* * * * *